US008342057B2

(12) United States Patent
Kwon

(10) Patent No.: US 8,342,057 B2
(45) Date of Patent: Jan. 1, 2013

(54) STEERING COLUMN FOR VEHICLE

(75) Inventor: Hyun Bi Kwon, Wonju-si (KR)

(73) Assignee: Mando Corporation, Gyeonggi-do (KR)

( * ) Notice: Subject to any disclaimer, the term of this patent is extended or adjusted under 35 U.S.C. 154(b) by 281 days.

(21) Appl. No.: 12/832,646

(22) Filed: Jul. 8, 2010

(65) Prior Publication Data

US 2011/0005346 A1   Jan. 13, 2011

(30) Foreign Application Priority Data

Jul. 9, 2009   (KR) .................. 10-2009-0062383

(51) Int. Cl.
  *B62D 1/18* (2006.01)
(52) U.S. Cl. ......................................... 74/493; 280/775
(58) Field of Classification Search .................... 74/493; 280/775

See application file for complete search history.

(56) References Cited

U.S. PATENT DOCUMENTS

| | | | | |
|---|---|---|---|---|
| 6,467,807 | B2 * | 10/2002 | Ikeda et al. ................... | 280/775 |
| 2007/0295143 | A1 * | 12/2007 | Oh ................................ | 74/493 |
| 2009/0120230 | A1 * | 5/2009 | Park .............................. | 74/493 |
| 2010/0139439 | A1 * | 6/2010 | Uesaka .......................... | 74/493 |

* cited by examiner

*Primary Examiner* — Justin Krause
(74) *Attorney, Agent, or Firm* — McDermott Will & Emery LLP

(57) ABSTRACT

A steering column for a vehicle can increase the entire strength of the steering column while maintaining a supporting force between an outer tube and an inner tube at the time of tightening or releasing an adjusting lever for a tilting or telescopic operation, thereby preventing deformation and breakage of the steering column when a driver operates a steering wheel.

6 Claims, 5 Drawing Sheets

STEERING COLUMN FOR VEHICLE

BACKGROUND OF THE INVENTION

1. Field of the Invention

The present invention relates to a steering column for a vehicle, and more particularly to a steering column for a vehicle which can increase the entire strength of the steering column while maintaining a supporting force between an outer tube and an inner tube at the time of tightening or releasing an adjusting lever for a tilting or telescopic operation, thereby preventing deformation and breakage of the steering column when a driver operates a steering wheel.

2. Description of the Prior Art

As generally known in the art, a steering column refers to a device for enclosing a steering shaft which transfers a rotational force generated when a driver operates a steering wheel to a rack and a pinion mechanism, in which the steering column supports the rotation of the steering shaft and is secured to a vehicle body through a bracket to fix the position of the steering column.

The steering column as mentioned above may further include a telescopic or tilting function for enhancing the driver's convenience. The tilting device is designed to adjust the fixing angle of the steering wheel. The telescopic device is formed by inserting two hollow tubes which can be axially extended or retracted, and has a function to absorb the shock energy by collapsing the steering shaft and the steering column when the vehicle is crashed.

Therefore, the steering device may be divided into a telescopic type or a tilting type steering device according to the function as mentioned above. Depending upon the case, a tilting function may be added to the telescopic type steering device. Hence, the driver can make a smooth steering operation by adjusting the projecting amount or tilting angle of the steering wheel which corresponds to his/her height or body shape using the above functions.

FIG. 1 is an exploded perspective view illustrating a portion of a steering column for a vehicle in the prior art.

As shown in FIG. 1, the conventional steering column for the vehicle, including: an outer tube 100 for receiving a steering shaft 175; an inner tube 170 inserted in the outer tube; a lower mounting bracket 165 for fixedly securing the inner tube 170 to a vehicle body; a upper mounting bracket 105 disposed over the outer tube 100 and secured to the vehicle body; a distance bracket 180 integrally fixed to the outer tube 100 and formed with a telescoping elongated hole 185; a tilting bracket 150 integrally formed with the upper mounting bracket 105 and provided with a tilt elongated hole 110; a fixed gear 145 formed on the outer side of the tilting bracket 150; a movable gear 140 detachably engaged with the fixed gear 145; a tilting bolt 130 penetrating through the tilt elongated hole 110; a cam 135 engaged with the movable gear 140; a washer 125 and a nut 120 for securing the cam 135 and an adjusting lever 115; and a spring 142 retained between the movable gear 140 and the fixed gear 145.

The tilting or telescopic operation is performed by tightening or releasing the adjusting lever 115. When the adjusting lever 115 is tightened by the driver, the tilting bracket 150 is narrowed to exert a pressure on the outer tube 100, and then the outer tube 100 is in close contact with the inner tube 170 to prevent the tilting or telescopic operation. In contrast, when the adjusting lever 115 is released by the driver, the pressure applied between the outer tube 100 and the inner tube disappears to make the tilting or telescopic operation available.

Here, the telescopic operation is performed by firstly releasing the adjusting lever 115, changing the position of the tilting bolt 130 along the telescoping elongated hole 185 formed at the distance bracket 180, and then tightening the adjusting lever 115 again to complete the telescopic operation.

On the other hand, the tilting operation is made by releasing the adjusting lever 115, changing the position of the tilting bolt 130 along the tilt elongated hole 110, and finally tightening the adjusting lever 115 to complete the tilting operation.

In a state that the adjusting lever 115 is locked, the outer tube 100 and the steering shaft 175 or the like are firmly fixed. However, when the adjusting lever 115 is released, the outer tube 100 and the inner tube 170 or the like can be tilted about the center 160 of tilting movement by the cam 135, or the steering column can be extended or retracted accordingly.

However, the conventional steering column for the vehicle as described above has drawbacks that a load is concentrated on the tilting bracket and the distance bracket which is designed to tighten the steering column through the tilting bolt and the adjusting lever, which weakens the supporting force for the steering column and the strength of the steering column itself.

Particularly, the conventional steering column for the vehicle still has drawbacks in that the connecting portion between the outer tube and the tilting bracket to be secured to the vehicle body through the mounting bracket is weak and reduces the overall strength of the steering column itself, compared with the steering column supporting force. Moreover, the steering column is deformed or broken due to a torsional load generated when the driver operates the steering wheel, and is seriously bent at the time of collision of the vehicle.

SUMMARY OF THE INVENTION

Accordingly, the present invention has been made to solve the above-mentioned problems occurring in the prior art, and an object of the present invention is to provide a steering column for a vehicle which can increase the entire strength of the steering column while maintaining a supporting force between an outer tube and an inner tube at the time of tightening or releasing an adjusting lever for a tilting or telescopic operation, thereby preventing deformation and breakage of the steering column when a driver operates a steering wheel.

In order to accomplish this object, there is provided a steering column for a vehicle, including: a hollow inner tube enclosing a steering shaft; and an outer tube provided with a first cutout which is elongated in a direction of the steering shaft at the end portion into which the inner tube is inserted, wherein a boss projecting from an outer surface in a radial direction is formed at the end portion of the first cutout.

In accordance with another aspect of the present invention, there is provided a steering column for a vehicle, comprising: a hollow inner tube enclosing a steering shaft; and a hollow outer tube provided with a first cutout which is elongated in a direction of the steering shaft at the end portion into which the inner tube is inserted, wherein a telescoping hole through which a tilting bolt is penetrated and which extends in the direction of the steering shaft is formed at guiding parts being spaced apart from and facing each other and extended in a radial direction at the opposite outer surfaces of the first cutout, and wherein second cutouts spaced apart from each other and opened toward the direction of the steering shaft is formed at a supporting part. The supporting part is a portion of the guiding parts where the guiding parts make contact with the outer surface.

According to the steering column for the vehicle with the construction as described above, it is possible to increase the entire strength of the steering column while maintaining the supporting force between the outer tube and the inner tube at the time of tightening or releasing the adjusting lever for the tilting or telescopic operation, thereby preventing deformation and breakage of the steering column when the driver operates the steering wheel.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
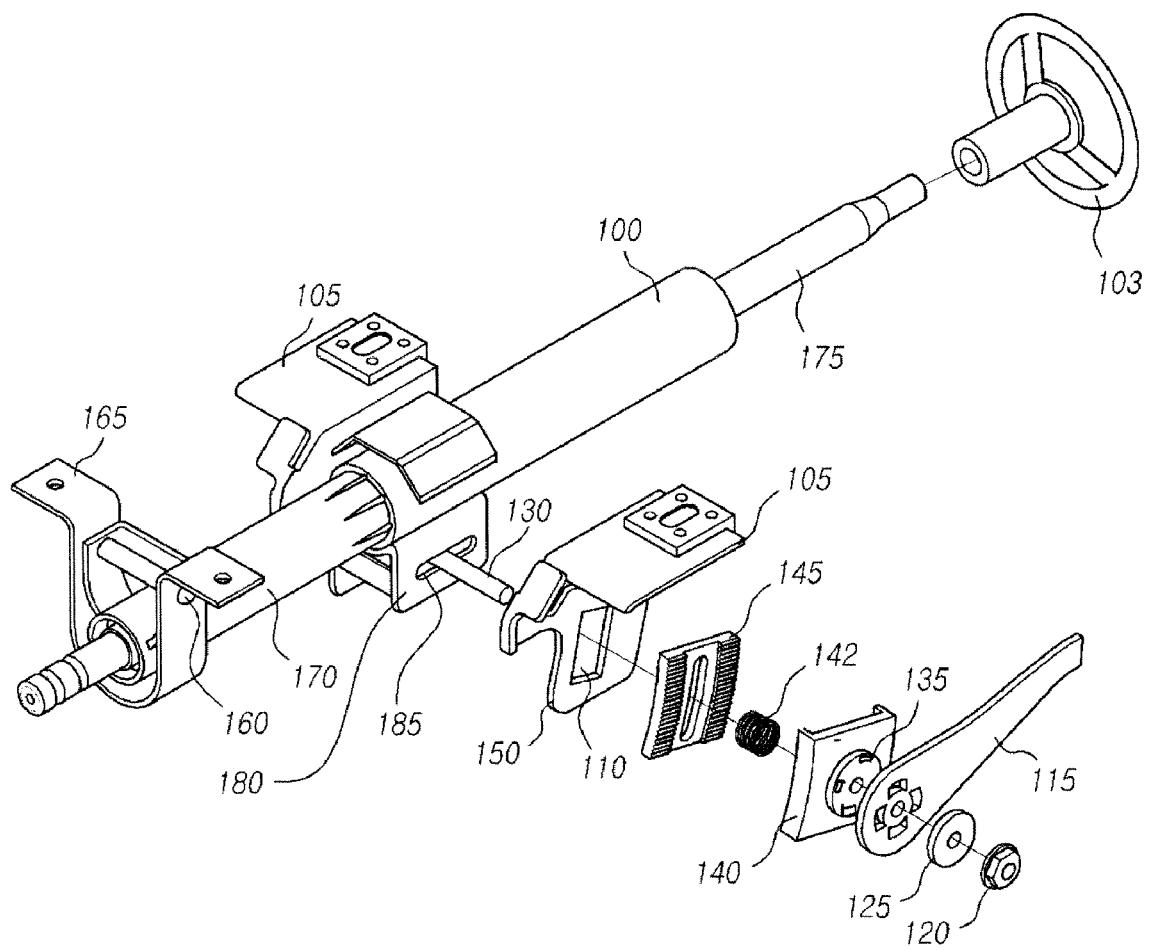
FIG. 1 is an exploded view illustrating a portion of a steering column for a vehicle in the prior art.

Hereinafter, a preferred embodiment of the present invention will be described with reference to the accompanying drawings. In the following description and drawings, the same reference numerals are used to designate the same or similar components, and so repetition of the description on the same or similar components will be omitted. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, assembled or joined to the second component.

Figure 2:
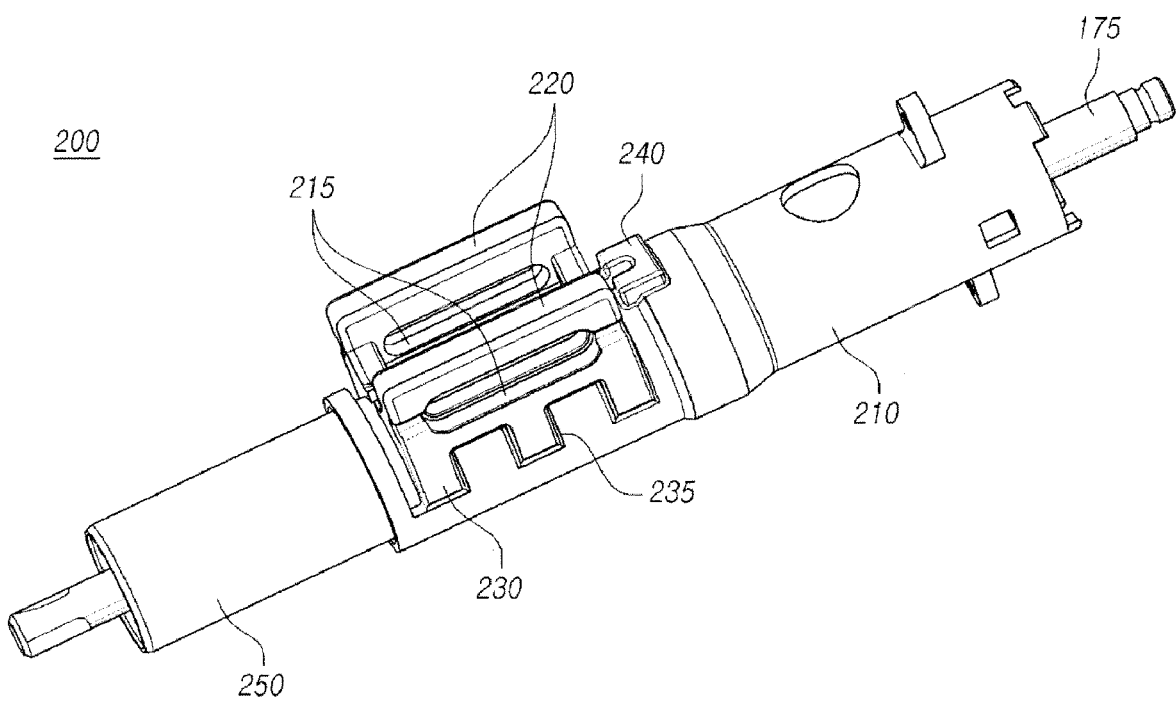
FIG. 2 is an exploded view illustrating a portion of a steering column for a vehicle in accordance with a preferred embodiment of the present invention.
Figure 3:
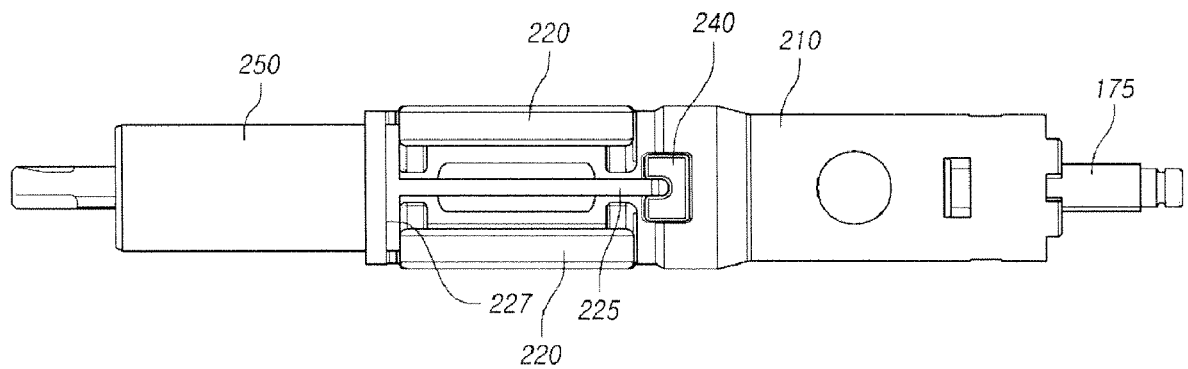
FIG. 3 is a plan view of FIG. 2.
Figure 4:
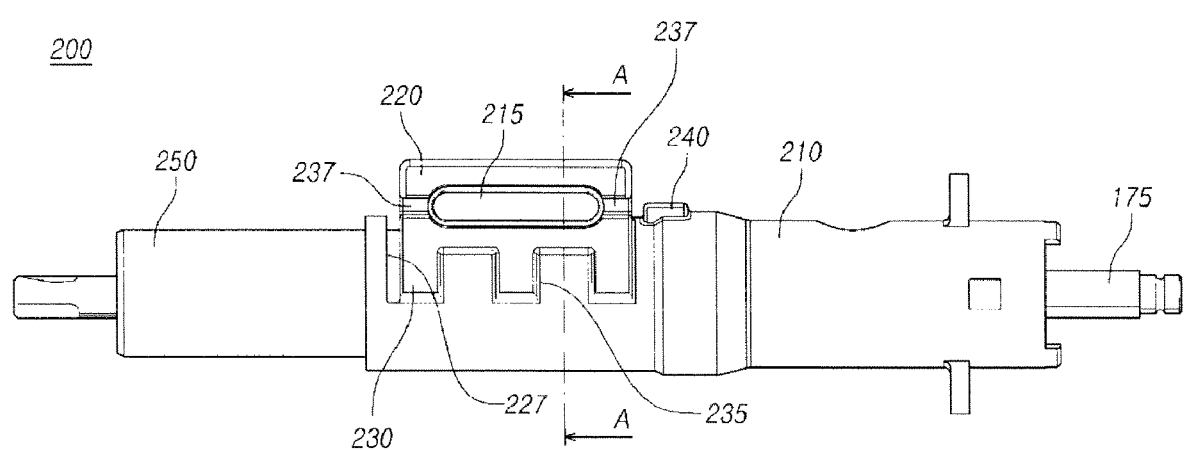
FIG. 4 is a side elevation view of FIG. 2.
Figure 5:
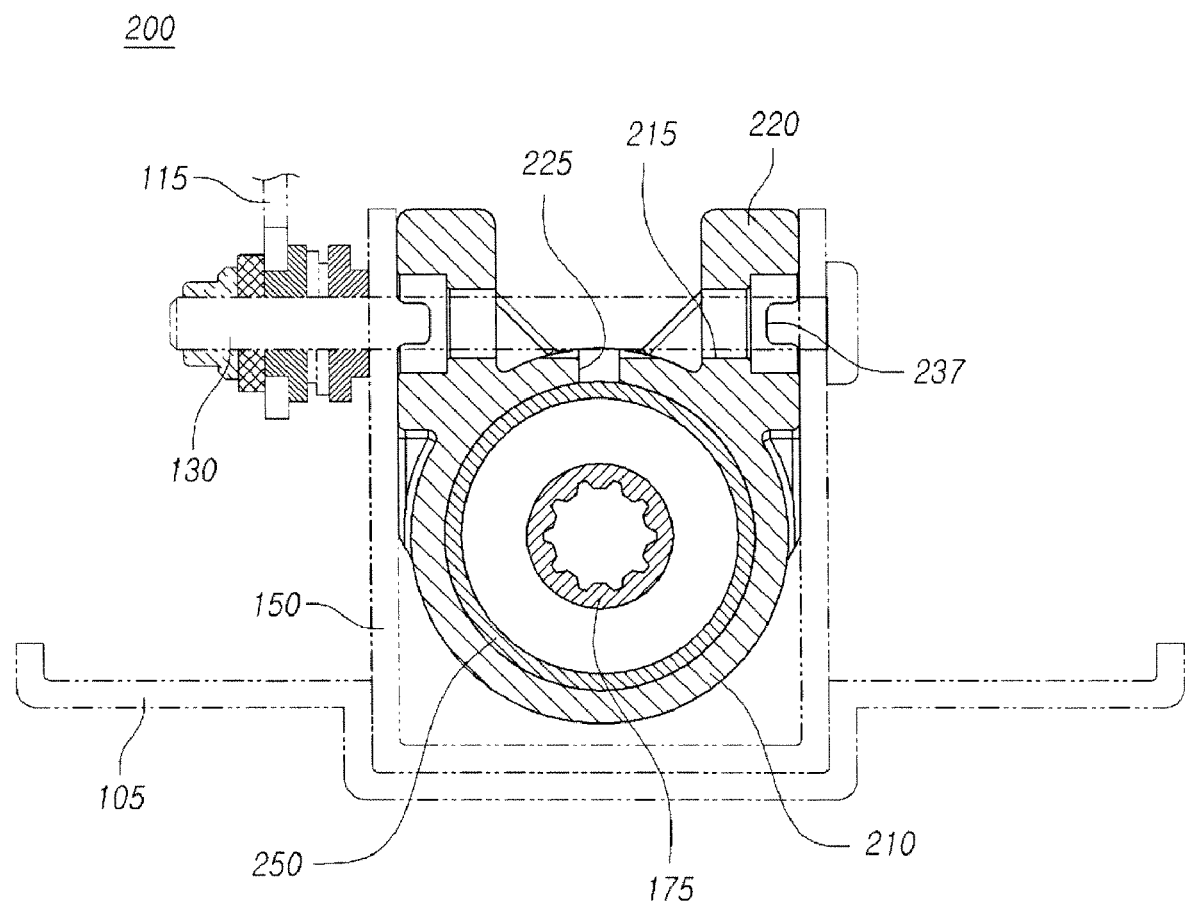
FIG. 5 is a sectional view of "A" portion of FIG. 4.

FIG. 2 is an exploded view illustrating a portion of a steering column for a vehicle in accordance with a preferred embodiment of the present invention, FIG. 3 is a plan view of FIG. 2, FIG. 4 is a side elevation view of FIG. 2, and FIG. 5 is a sectional view of "A" portion of FIG. 4.

Referring to FIGS. 2 to 5, a steering column 200 for a vehicle in accordance with a preferred embodiment of the present invention includes a hollow inner tube 250 enclosing a steering shaft 175, and an outer tube 210 provided with a first cutout 225 which is elongated in a direction of the steering shaft 175 at the end portion into which the inner tube 250 is inserted, wherein a boss 240 projecting from an outer surface thereof in a radial direction is formed at the end portion of the first cutout 225.

In addition, a steering column 200 for a vehicle in accordance with another embodiment of the present invention includes a hollow inner tube 250 enclosing the steering shaft 175, and a hollow outer tube 210 provided with a first cutout 225 which is elongated in a direction of the steering shaft 175 at the end portion into which the inner tube 250 is inserted, wherein a telescoping hole 215, through which a tilting bolt 130 is penetrated and which extends in the direction of the steering shaft 175, is formed at guiding parts 220 being spaced apart from and facing each other and extended in a radial direction at the opposite outer surfaces of the first cutout 225, and wherein second cutouts 235 spaced apart from each other and opened toward a direction of the steering shaft 175 is formed at a supporting part 230. The supporting part 230 is a portion of the guiding portions 220 where the guiding parts 220 make contact with the outer surface.

In the steering column 200 for the vehicle in accordance with the present invention, the inner tube 250 is inserted into the outer tube 210. When the driver tightens or releases the adjusting lever 115 and the tilting bolt 130 coupled with the telescoping hole 215 of the guiding parts 220, the guiding parts 220 of the outer tube 210 are shrunk or relaxed in a direction perpendicular to the steering shaft 175 to exert a pressure on or release the same from the inner tube, which makes it possible to perform a tilting or telescopic function.

Here, the inner tube 250 is formed in a hollow type enclosing the steering shaft 175 and fixedly secured to a vehicle body through the lower mounting bracket 165 (refer to FIG. 1). When the tilting function is performed, the inner tube 250 is rotated about a hinge axis, i.e., the center 160 of tilting movement (refer to FIG. 1) provided at the lower mounting bracket 165. In contrast, when the telescopic function is performed, the inner tube 250 plays the role of a guide to allow the outer tube 210 to be slid in the direction of the steering shaft 175 along the inner tube 250.

Meanwhile, the hollow outer tube 210 inserted in the direction of the steering shaft 175 into the outside of the inner tube 250 which is secured to the vehicle body is provided with a first cutout 225 extending in the direction of the steering shaft 175 at the end portion into which the inner tube 250 is inserted.

Alternatively, the first cutout 225 may be opened toward the end portion which the inner tube 250 is inserted into and coupled therewith.

The first cutout 225 makes it easy to press the inner tube 250 by shrinking the outer tube 210 when the driver tightens the adjusting lever 115 again after he/she properly sets the steering column depending upon the driver's body features by releasing the adjusting lever 115 for the tilting or telescopic operation.

The outer tube 210 is formed with a boss 240 projecting from the outer surface thereof in a radial direction at the end of the opposite first cutout 225 of the end portion where the inner tube 250 is inserted. Hence, it is possible to prevent the deformation or the breakage of the outer tube 210 due to a torsional load generated at the steering column when the driver operates the steering wheel.

Provided at the locations spaced apart from both sides of the first cutout 225 are the guiding parts 220 to support the adjusting lever 115 when the adjusting lever 115 is tightened. The guiding parts 220 are extended in a radial direction at the opposite outer surfaces of the first cutout 225, while being spaced apart from and facing each other.

In other words, the guiding parts 220 formed in a flange shape with a certain thickness are provided on the outer surface of the outer tube 210 in a direction perpendicular to the steering shaft 175 so as to shrink the first cutout 225 which is formed in an elongated slit shape in the direction of the steering shaft 175. Each of the guiding parts 220 is formed with a telescoping hole 215 in the direction of the steering shaft 175, which a tilting bolt 130 is penetrated into and the outer tube 210 is slidably moved when the telescopic function is performed.

In addition, since each of the guiding parts 220 is provided with a groove 237 which is formed on the opposite sides of the telescoping hole 215 in the direction of the steering shaft 175, the guiding parts 220 are easily narrowed when the driver tightens the adjusting lever 115, which facilitates the first cutout 225 to be shrunk with ease.

Meanwhile, the second cutouts 235 which are spaced apart from each other and opened toward the direction of the steering shaft 175 are provided at the supporting part 230 contacting the outer surface of the outer tube 210. Hence, the torsional load generated at the steering column when the driver operates the steering wheel may be distributed to increase the strength of the entire steering column.

In other words, the guiding parts 220 of the outer tube 210 are secured to the vehicle body through the tilting bracket 150 and the upper mounting bracket 105. When the driver operates the steering wheel, the torsional load is concentrated on the supporting part 230 which is connected to the guiding parts 220 of the outer tube 210. Therefore, the torsional load is more uniformly distributed and absorbed along the outer surface of the outer tube 210 through the second cutouts 235 than the case when the supporting part 230 is integrally formed thereto.

Preferably, a third cutout 227 may be provided at the end portion of the outer tube 210 into which the inner tube 250 is inserted. The third cutout 227 is opened toward the radial direction, communicating with the first cutout 225. Provision of the third cutout 227 as described above makes the first cutout 225 shrinkable, which facilitates the outer tube 210 to press the inner tube 250 when the driver tightens the adjusting lever 115.

The guiding parts 220 as such are coupled with the tilting bracket 150 and then restricted by the adjusting lever 115 and the tilting bolt 130 passing through both the tilting bracket 150 and the telescoping hole 215. Consequently, the guiding parts 220 are shrunk and relaxed by the operation of the adjusting lever 115, which makes it possible to perform the tilting or telescopic function.

According to the steering column for the vehicle with the construction as described above, it is possible to increase the entire strength of the steering column while maintaining the supporting force between the outer tube and the inner tube at the time of tightening or releasing the adjusting lever for the tilting or telescopic operation, thereby preventing deformation and breakage of the steering column when the driver operates the steering wheel.

In addition, since terms, such as "comprising," "including," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are defined otherwise. A term ordinarily used like that defined by a dictionary shall be construed that it has a meaning equal to that in the context of a related description, and shall not be construed in an ideal or excessively formal meaning unless it is clearly defined in the present specification.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the embodiment disclosed in the present invention is intended to illustrate the scope of the technical idea of the present invention, and the scope of the present invention is not limited by the embodiment. The scope of the present invention shall be construed on the basis of the accompanying claims, and it shall be construed that all of the technical ideas included within the scope equivalent to the claims belong to the present invention.

What is claimed is:

1. A steering column for a vehicle, comprising:
   a hollow inner tube enclosing a steering shaft; and
   a hollow outer tube having a first cutout defined at an end portion of the outer tube, the outer tube being configured to receive the inner tube at the end portion of the outer tube, the first cutout being elongated in a direction of the steering shaft,
   wherein a telescoping hole through which a tilting bolt is penetrated and which extends in the direction of the steering shaft is defined in a pair of guiding parts spaced apart from each other and facing each other, the guiding parts being disposed on an outer surface of the outer tube and extending in a radial direction of the outer tube on respective sides of the outer surface opposite from the first cutout, and
   wherein second cutouts spaced apart from each other and opened toward the direction of the steering shaft are defined at a portion of the guiding parts that make contact with the outer surface of the outer tube.

2. The steering column for the vehicle as recited in claim 1, wherein the first cutout is opened toward the end portion of the outer tube.

3. The steering column for the vehicle as recited in claim 1, wherein
   a third cutout is defined at the end portion of the outer tube, and
   the third cutout is opened in the radial direction, communicating with the first cutout.

4. The steering column for the vehicle as recited in claim 1, wherein the outer tube is provided with a boss projecting from the outer surface in the radial direction at a first end of the first cutout to a second end of the first cutout at the end portion of the outer tube.

5. The steering column for the vehicle as recited in claim 1, wherein
   each of the guiding parts has a groove defined therein, and
   the groove is defined in the direction of the steering shaft on opposite sides from the telescoping hole.

6. A steering column for a vehicle, comprising:
   a hollow inner tube enclosing a steering shaft; and
   an outer tube having a first cutout defined at an end portion of the outer tube, the outer tube being configured to receive the inner tube at the end portion of the outer tube, the first cutout being elongated in a direction of the steering shaft,
   wherein a boss projecting from an outer surface of the outer tube in a radial direction of the outer tube is disposed at a first end portion of the first cutout opposite to a second end portion of the first cutout at the end portion of the outer tube.

* * * * *